United States Patent [19]

Milan

[11] 3,784,071
[45] Jan. 8, 1974

[54] VARIABLE LENGTH FESTOONING OF WEB MATERIAL

[75] Inventor: Ernest A. Milan, Cuyahoga Falls, Ohio

[73] Assignee: The Goodyear Tire & Rubber Company, Akron, Ohio

[22] Filed: Apr. 2, 1973

[21] Appl. No.: 347,295

[52] U.S. Cl. .................. 226/1, 226/42, 226/93, 226/170, 242/182
[51] Int. Cl. .................................. B65h 17/34
[58] Field of Search ............... 226/1, 42, 93, 95, 226/170; 242/182, 183, 184, 185

[56] References Cited
UNITED STATES PATENTS

| | | | |
|---|---|---|---|
| 2,331,947 | 10/1943 | Wack | 226/170 X |
| 3,203,607 | 8/1965 | Mason | 226/170 X |
| 3,563,492 | 2/1971 | Ferrier | 242/184 |

*Primary Examiner*—Richard A. Schacher
*Attorney*—F. W. Brunner et al.

[57] ABSTRACT

Variable length storage of running length material between stations in a web handling or processing line in which storage of the self-supporting portion of the variable length is nearly constant in length independent of the total length of the stored loop. The sides of the stored variable length loop are held against the respective surfaces of a pair of opposed and nearly vertical endless belts each of which belt is drivable in a direction generally opposite to that of the other belt. Each belt is driven independently of the other belt by drive means at least one of which is controlled in response to a pair of sensors respectively detecting the predetermined maximum and minimum extents of the length of the stored loop. In the particular and proximate utility of the invention, the web being handled comprises bias-cut wire fabric breaker belt stock for use in pneumatic tires. The respective sides of the variable length loop are held against the associated surfaces of the belts to insure movement of the web together therewith by a plurality of magnets arranged to act through the belt.

15 Claims, 4 Drawing Figures

PATENTED JAN 8 1974　　　　　　　　　　　　　　　3,784,071

VARIABLE LENGTH FESTOONING OF WEB MATERIAL

The present invention relates to festooning of web material and particularly to festooning a web of tire fabric stock.

The terms, festoon and festooning, as used in the present specification are to be understood to mean an apparatus and a process, respectively, for providing a first in/first out inventory or storage of a running length of web material, such as of tire fabric stock, between stations in a web handling or processing sequence so as to accommodate variations in rate of supply to and withdrawal from such inventory.

The invention's objectives are an improved method of festooning such stock and an improved apparatus for carrying out such method.

To acquaint persons skilled in the art with the principles of the invention and to enable such persons to practice the invention, a presently preferred embodiment thereof, now believed to be the best mode for making and using the same, will be described, it being understood that the following description is by way of example only and not limitative of the invention, the scope of which is set forth in the appended claims.

Figure 1:
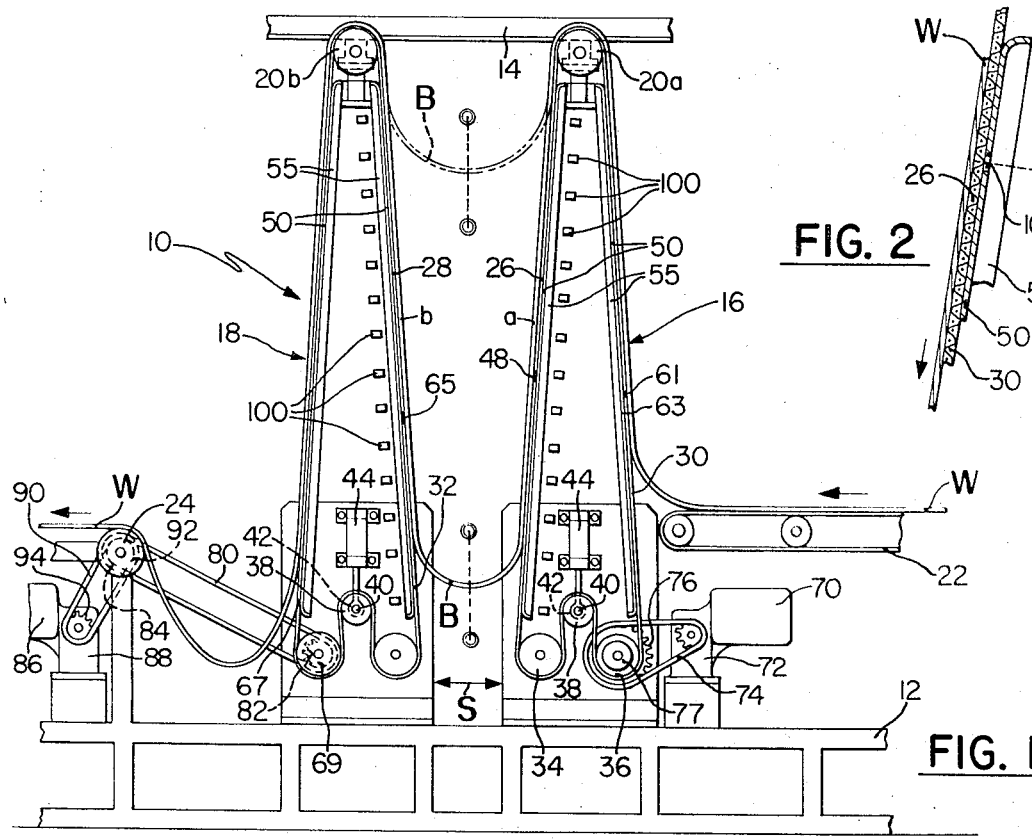
FIG. 1 is a schematic view in front elevation of an apparatus according to the invention.

Making reference to the drawings and particularly to FIG. 1, an apparatus 10 in accordance with the invention comprises a base 12 which supports a frame 14 including two towers 16,18 each standing vertically or nearly so from the base 12. Each tower is constructed of suitably rigid material and at its upper extremity carries a festoon roll 20a,20b each mounted rotatably in conventional pillow block bearings fixed on the respective towers 16,18. The face width of the rolls 20a,20b and the width dimension of the tower in a direction normal to the plane of FIG. 1 can be determined at will to suit the maximum lateral width of the web W to be accommodated.

The web accommodated by the apparatus is brought from a preceding station in the web handling or processing line (not shown) by a web conveyor 22 to the festooning apparatus 10. The web is conducted away from the apparatus to a subsequent station of the line by any suitable means such as the motor driven roll 24. Between the festoon rolls 20a,20b a variable length of the web W forms a loop which resembles the letter "U." In accordance with the invention and contrary to the practice common in the prior art, the self-sustaining portion B of the loop, which is the bottom and curved portion of the letter U, is to be maintained at least approximately constant in length while the vertical or at least approximately vertical sides $a$ and $b$ of the U are held against movable supports 26 and 28, respectively.

In the apparatus 10, the respective supports 26,28 are provided by a plurality of endless flexible carriers, each being in particular a flat endless belt 30,32. The belt 30 is trained about and supported by the festoon roll 20a(, an idler roll 34, and a belt driving roll 36. The idler roll 34 and the belt driving roll 36 are rotatably supported in bearings fixed in the tower 16.

To apply and maintain a suitable tension in the belt 30, a belt tensioning roll 38 is carried rotatably in bearings 40 supported by the rod ends 42 of a pair of fluid pressure cylinders 44.

Figure 2:
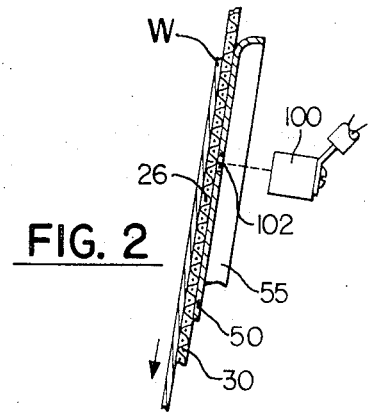
FIG. 2 is an enlarged view of a portion of FIG. 1.

To provide support for the vertical or nearly vertical side $a$ of the loop, the belt 30 travels downwardly along a reach 48 defined by a plurality of slide plates 50, best seen in FIG. 2, which are of aluminum, stainless steel or other non-magnetic rigid material, and are secured in the tower 16 to present a plane slide surface along which the belt can slide. Such slide plates may, if desired, be a single continuous plate extending between the festoon roll 20a and the idler roll 34. A plurality of permanent magnets 55 are affixed to the plate or plates 50 at intervals to act through the plate or plates 50 and the belt 30 to hold the side a of the festoon along the maximum length thereof. The magnets may, if desired, be electromagnets but applicant has found that commercially available permanent magnets of ferrite material are satisfactory. The magnets 55 serve to urge the side $a$ of the loop into intimate non-slip contact with the surface of the belt 30 thereby preventing strain in such side and causing the web W to move in coincidence with the belt 30. Thus, the only strain or deformation experienced by the web in the loop or festoon is that due to the weight only of the bight or self-supported portion B of the web which, as has been mentioned, remains nearly constant in length, and hence in weight, whatever the length of loop disposed in the apparatus 10.

The up-running reach 61 of the belt 30 travels over a plate or a plurality of plates 63 which in like manner have a plurality of magnets 55 by which the web W is urged into non-slip contact with the surface of the belt 30 and to be carried thereby to the festoon loop B.

In the apparatus 10, the second tower 18 is identical in structure to that of the first tower 16 just described but is arranged oppositely in hand, as will be observed in FIG. 1, such that the second support, for the loop side $b$, provided by the reach 65 of belt 32, is movable upwardly in a direction opposite or nearly so with respect to the direction of movement of the previously described downwardly movable reach of the belt 30 or first support. The belt 32 travels upwardly to and turns about the festoon roll 20b and thence downwardly along a reach 67 to turn about the drive roll 69.

To control the length of web W contained in the bight or self-supporting catenary portion B, which portion is self-supporting in that it is free of contact with any external support, the space S between the towers 16 and 18 can be adjusted or selected to suit the particular web material in accordance with its physical characteristics. Generally, the towers and the support surfaces will be spaced so that the bight portion will have a minimum radius of curvature not less than the minimum radius desirable for a roll about which such web is wrapped or wound. The minimum radius for such a roll will be known to or readily ascertained by anyone skilled in the related art.

In order to move the first belt 30, conventional drive means including a motor 70, a gear reducer 72, and a flexible belt or chain 74 are connected to a sprocket 76 or its equivalent which is mounted for corotation with and controllable by a clutch 77 which operates to connect and disconnect the drive means to and from the drive roll 36. The drive roll 36 is mounted for rotation by conventional bearings fixed on the tower 16. The belt 30 is turned about and is driven by the roll 36.

To drive the second belt 32, a flexible drive belt or chain 80 corotatably connects a pulley or sprocket 82 affixed corotatably on the roll 69 with a pulley or sprocket 84 corotatably mounted on the exit drive roll 24 which is driven by a motor 86 and gear reducer 88 through a flexible belt or chain 90 which drivably interconnects a second sprocket 92 on the exit roll 24 with the sprocket 94 on the gear reducer 88.

In order to detect the position of the bight B and thereby the length of loop stored in the apparatus 10 at any instant, a plurality of sensors 100 are disposed along the path traversed by the belts 30,32. While numerous types of sensors can be used, as will now be apparent, in the apparatus 10 each sensor is of a commercially available type responsive to the presence or absence of a metallic body within a zone of proximity effect on the sensor. Each sensor operates to provide a signal indicative of the presence of the loop as the length of loop is extended into proximity with the sensor. Such sensors are available for example from Micro Switch, Inc. of Freeport, Illinois, designated as type FMH-I. Each sensor is mounted in alignment with a hole 102 in the associated plate 50 so as to be affected by the presence or absence of the web W in the zone of proximity. In operation, the apparatus 10 constitutes a component of a web handling line and receives web material by way of the conveyor 22 from an immediately preceding station at a first rate and delivers web material by way of the exit roll 24 to an immediately succeeding station in the line at a second rate. The rates referred to are ratios of the length of web moved past a given point per unit of time. The respective rates vary each with respect to the other over certain periods of time such that web material tends to accumulate in the loop or festoon at some periods and then to be taken out of the loop at other periods. The drive motor 70 and/or the clutch 77 are actuated to move the belt 30 in timed relation with the preceding station which is, for example, a breaker belt ply splicer, which moves the web W at a varying rate, and in particular, alternately moving and stopping the web. The belt 32 is moved, by the drive belt or chain 80, in timed relation with the exit roll 24 and the next succeeding or "downstream" station which is, for example, a rewinding station wherein the breaker belt ply is wound into a roll at a second rate different from the first rate. The latter rate may be constant or variable but is preferably controlled so as to "average out" variations in the first or input rate of web delivery into the apparatus 10.

Figure 3:
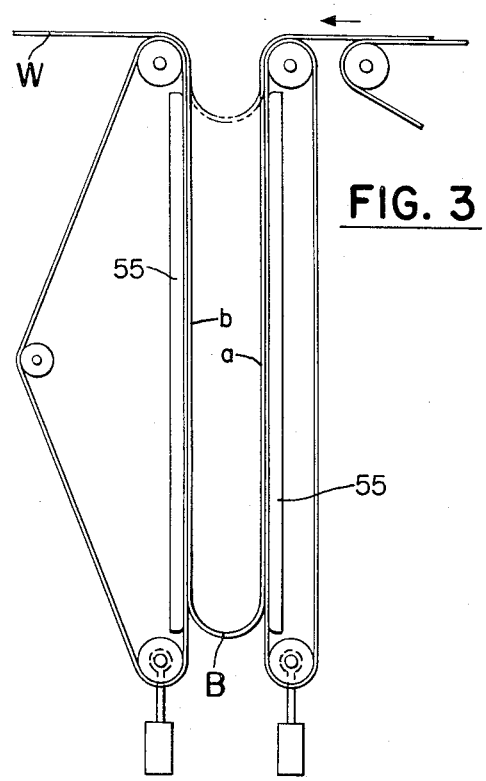
FIGS. 3 and 4 are schematic diagrams of alternative embodiments of the invention.
Figure 4:
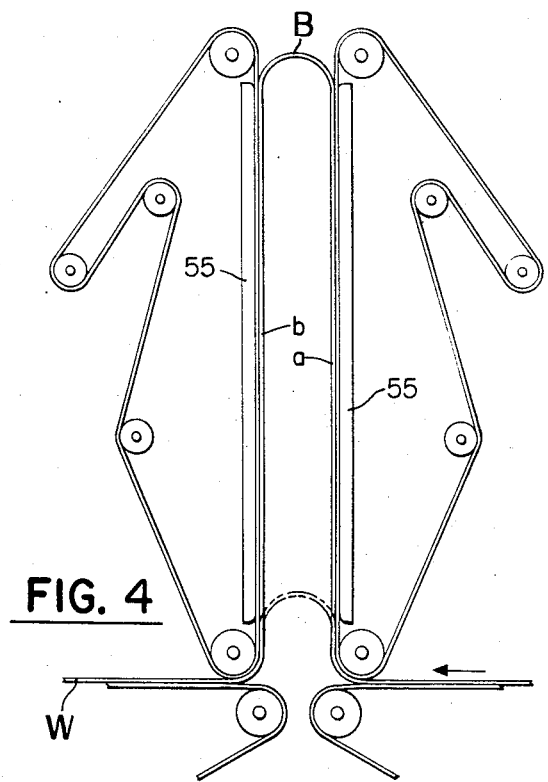

The respective towers 16,18 and the paths traversed by the respective belts 30,32 are substantially vertical. The term "substantially vertical" herein is to be understood to mean within about 15° with respect to the vertical. The respective belt paths 48,65 of the apparatus 10 are at approximately 7° each with respect to the vertical. The principles of the invention can, where available space permits or requires, be applied by forming the festoon loop or loops downwardly as is indicated schematically in FIG. 3. It will be apparent also that the vertical orientation, while preferred, is not a necessary condition. With the sides a and b of the storage loop held against the belts, by magnetic attraction, or for example by suction pressure acting through perforations in the belts, the loop can be made to extend upwardly as shown schematically in FIG. 4, or at angles from the vertical to and including horizontal. The storage capacity of the loop can be varied either by varying the height of the towers and thereby the length of the single loop carried by the supports, or alternatively by employing a plurality of loops sustained by a plurality of pairs of supports while maintaining any self-supporting portion of the web at or about constant in length.

While certain representatives embodiments and details have been shown for the purpose of illustrating the invention, it will be apparent to those skilled in the art that various changes and modifications may be made therein without departing from the spirit or scope of the invention.

What is claimed is:

1. The method of festooning web material comprising holding two sides of a variable length loop of said material each side against a movable support, whereby the self-supporting portion of the loop remains at least approximately constant in length independently of variations in the total length of such loop; each said support being at least approximately parallel to and movable along a path in a direction opposite with respect to the other said support.

2. The method as claimed in claim 1, said support and the respectively associated side being held at least approximately vertical in orientation.

3. The method as claimed in claim 1, wherein said web comprises magnetically attractable material and said holding is effected by magnetic force.

4. The method as claimed in claim 3, wherein said magnetic force is applied along a length of said support at least equal to the maximum length of said side supported thereby.

5. The method as claimed in claim 4, said support comprising an endless flexible non-magnetic belt and said magnetic force being exerted through said belt.

6. The method as claimed in claim 1, further comprising regulating the rate of movement of one of said supports with respect to the other thereof in response to variation in total length of web contained in such loop.

7. Apparatus for festooning a web in a variable length loop thereof having opposing sides and a self-supporting portion therebetween comprising a pair of movable supports each support being engageable with a respectively associated side of said loop to move such side therewith; each said support being at least approximately parallel to, and movable along a path in a direction opposite with respect to, the other thereof; whereby said self-supporting portion remains at least approximately constant in length independent of variations in the total length of said loop.

8. Apparatus as claimed in claim 7, said support comprising an endless flexible carrier, a plurality of rolls supporting siad carrier within the loop thereof.

9. Apparatus as claimed in claim 7, wherein said carrier is a non-magnetic belt.

10. Apparatus as claimed in claim 7, further comprising means urging said web toward engagement with at least one of said supports.

11. Apparatus as claimed in claim 10, wherein said means for urging said web comprising a plurality of magnets affixed along said path for acting through said support.

12. Apparatus as claimed in claim 7, said supports being oriented at least approximately vertical.

13. Apparatus as claimed in claim 7, comprising first and second driving means operable respectively to move said supports independently of each other.

14. Apparatus as claimed in claim 13, including a plurality of sensors disposed along said path, each sensor being operable to detect presence and absence of said loop thereat.

15. Apparatus as claimed in claim 13, including regulating means connected to regulate one of said first and second drive means in response to at least two of said sensors.

* * * * *